US011935674B2

(12) United States Patent
Amisawa et al.

(10) Patent No.: US 11,935,674 B2
(45) Date of Patent: Mar. 19, 2024

(54) LAMINATED VARISTOR

(71) Applicant: Panasonic Intellectual Property Management Co., Ltd., Osaka (JP)

(72) Inventors: Mikinori Amisawa, Hokkaido (JP); Masuto Omiya, Hokkaido (JP); Kouji Hirate, Yamaguchi (JP); Yukihito Yamashita, Hokkaido (JP); Touichi Makita, Hokkaido (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 62 days.

(21) Appl. No.: 17/359,721

(22) Filed: Jun. 28, 2021

(65) Prior Publication Data

US 2021/0327617 A1 Oct. 21, 2021

Related U.S. Application Data

(63) Continuation of application No. PCT/JP2020/011116, filed on Mar. 13, 2020.

(30) Foreign Application Priority Data

Apr. 15, 2019 (JP) ................................ 2019-077006

(51) Int. Cl.
*H01C 7/112* (2006.01)
*H01C 1/14* (2006.01)

(52) U.S. Cl.
CPC ............... *H01C 7/112* (2013.01); *H01C 1/14* (2013.01)

(58) Field of Classification Search
CPC .................................. H01C 7/112; H01C 1/14
See application file for complete search history.

(56) References Cited

U.S. PATENT DOCUMENTS 5,369,390 A * 11/1994 Lin ......................... H01C 7/10 338/21
6,232,867 B1 * 5/2001 Yoshida ................ H01C 7/102 338/21

(Continued)

FOREIGN PATENT DOCUMENTS

JP 5-159618 6/1993
JP 2001-155957 6/2001

(Continued)

OTHER PUBLICATIONS

JP-2004119314, machine translation. (Year: 2004).*

(Continued)

*Primary Examiner* — Kyung S Lee
(74) *Attorney, Agent, or Firm* — Rimon P.C.

(57) ABSTRACT

An object is to provide a laminated varistor excellent in clamping voltage ratio. Laminated varistor includes at least a pair of internal electrodes provided in varistor layer containing ZnO as a main component.
Internal electrode contains Ag as a main component and is made of a metal containing at least one type selected from Pt and Au. The total weight of Pt and Au with respect to the weight of the metal constituting internal electrode is set between 2% and 30% (inclusive). With such a configuration, diffusion of Ag into varistor layer can be prevented, and a laminated varistor excellent in clamping voltage ratio can be obtained.

9 Claims, 1 Drawing Sheet

(56) References Cited

U.S. PATENT DOCUMENTS

| | | | | |
|---|---|---|---|---|
| 2004/0119579 | A1* | 6/2004 | Takehana ............. | H01C 17/283<br>338/20 |
| 2015/0047878 | A1* | 2/2015 | Tamaki ................... | H01L 24/29<br>428/570 |
| 2016/0314880 | A1* | 10/2016 | Dernovsek ........... | H01C 17/283 |

FOREIGN PATENT DOCUMENTS

| | | | | |
|---|---|---|---|---|
| JP | 2004119314 | | * | 4/2004 |
| JP | 2007-043133 | | | 2/2007 |
| KR | 20100018167 | A | * | 8/2008 |
| TW | I605029 | | * | 11/2017 |

OTHER PUBLICATIONS

TW-I605029, machine translation. (Year: 2017).*
KR 1020100018167 machine translation. (Year: 2008).*
International Search Report of PCT application No. PCT/JP2020/011116 dated Jun. 16, 2020.

* cited by examiner

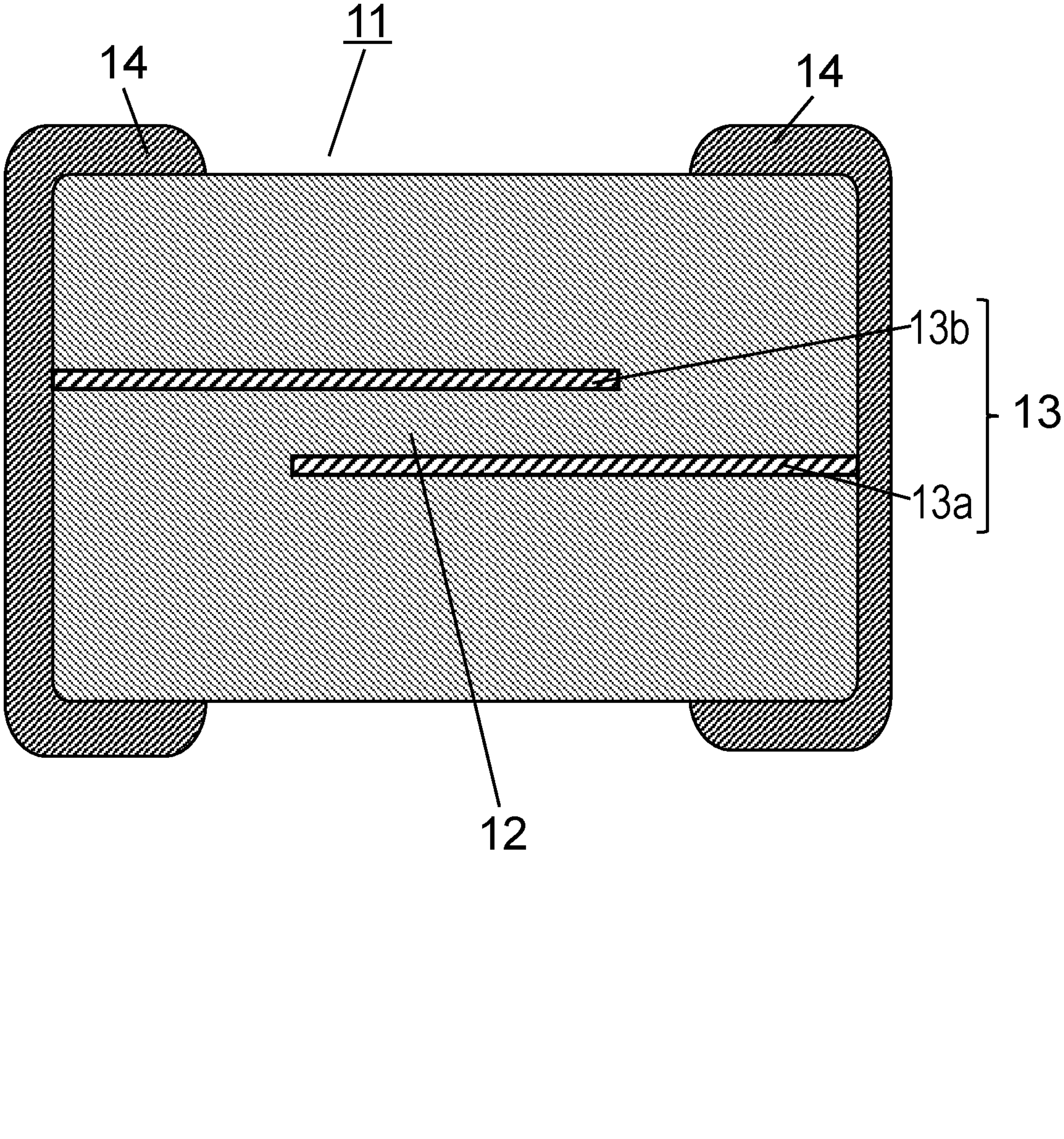
11
14
14
13b
13
13a
12

LAMINATED VARISTOR

BACKGROUND

1. Technical Field

The present disclosure relates to a laminated varistor used for various electronic devices.

2. Description of the Related Art

In recent years, miniaturization of home appliances and in-vehicle materials has progressed, and a varistor which is a component thereof is also required to be miniaturized. Therefore, a laminated varistor in which a varistor layer and an internal electrode are laminated has been proposed. As prior art document information related to the invention of this application, PTL 1 is known as an example.

CITATION LIST

Patent Literature

PTL 1: Unexamined Japanese Patent Publication No. 2007-43133

SUMMARY

However, when Ag is used for the internal electrode, free electrons in

ZnO are incorporated by diffusion of Ag in the internal electrode. Therefore, the specific resistance of ZnO increases, and a clamping voltage in the large current region increases, so that the function as a varistor is deteriorated.

In view of this problem, an object of the present disclosure is to provide a laminated varistor in which Ag diffusion during sintering in a ZnO-based laminated varistor is suppressed.

In order to solve the above problems, a laminated varistor of the present disclosure includes at least a pair of internal electrodes provided in a ceramic layer containing ZnO as a main component. The internal electrode contains Ag as a main component, and is made of a metal containing at least one type selected from Pt and Au. The total weight percentage of Pt and Au to the weight of the metal constituting the internal electrode is between 2 wt % and 30 wt % (inclusive).

With the above configuration, by adding Pt or Au having a high standard reduction potential to diffusion of Ag into the ceramic due to ionization of Ag in the internal electrode, Ag ions are reduced and returned to metal. This makes it possible to prevent diffusion of Ag in the ceramic and to provide a laminated varistor excellent in clamping voltage ratio.

BRIEF DESCRIPTION OF THE DRAWINGS

FIG. 1 is a cross-sectional view of a laminated varistor according to an exemplary embodiment of the present disclosure.

DETAILED DESCRIPTION

Hereinafter, a laminated varistor according to an exemplary embodiment of the present disclosure will be described with reference to the drawing.

FIG. 1 is a cross-sectional view of laminated varistor 11 according to the exemplary embodiment of the present disclosure, in which varistor layer 12 containing ZnO as a main component and internal electrodes 13 containing Ag as a main component are alternately laminated. Internal electrodes 13 are alternately extended to both ends of laminated varistor 11, and are electrically connected to external electrodes 14 at both ends. Varistor layer 12 contains ZnO as a main component and $Bi_2O_3$, $Co_3O_4$, $MnO_2$, $Sb_2O_3$, and the like as accessory components. Internal electrode 13 is formed by sintering alloy particles containing 95 wt % of Ag and 5 wt % of Au. Here, wt % means weight %. That is, the alloy particles containing 95 wt % of Ag and 5 wt % of Au are alloy particles containing 95% of Ag and 5% of Au in weight percentage. Ag in internal electrode 13 is oxidized (ionized) during baking, and diffuses into the ceramic mainly composed of ZnO and sandwiched between internal electrodes 13. Ag thus diffused removes free electrons in ZnO by substituting Zn between ceramic lattices with Ag, and the specific resistance of ZnO increases. Therefore, the clamping voltage at the time of applying abnormal current, which is a main function as a varistor, increases, and the absorption function of abnormal current decreases.

On the other hand, in the present exemplary embodiment, Au having a standard reduction potential higher than that of Ag is added to internal electrode 13. A lower standard reduction potential (negative potential) serves as an oxidant, and a higher standard reduction potential (positive potential) serves as a reductant. Therefore, by adding the metal having a high standard reduction potential with respect to diffusion of Ag into varistor layer 12 due to ionization of Ag in internal electrode 13, Ag ions are reduced and return to the metal, and thus diffusion of Ag in varistor layer 12 is prevented. As a result, a laminated varistor with a low clamping voltage ratio can be provided.

Note that the same effect can be also obtained by adding Pt having a higher standard reduction potential than Ag as in Au instead of Au. Since Au or Pt to be added acts on Ag, the effect is determined by the amount of addition to Ag. Therefore, the total weight percentage of Pt and Au to the metal constituting internal electrode 13 is desirably between 2 wt % and 30 wt % (inclusive). When the total weight percentage of Pt and Au is less than 2 wt %, a sufficient effect cannot be obtained. As the total weight ratio of Pt and Au increases, the effect of diffusion prevention tends to increase. However, even when the total weight percentage of Pt and Au exceeds 30 wt %, the improvement effect is not so large, and Pt or Au is expensive with respect to Ag. Therefore, the total weight percentage of Pt and Au is desirably between 2 wt % and 30 wt % (inclusive).

In addition, since Au has the higher standard reduction potential than Pt, the effect of diffusion prevention is more easily obtained in Au. Therefore, when a ceramic material that can be sintered at a low temperature is used, it is desirable to use Au. Since Pt has a higher melting point than Au, it is desirable to use Pt when the sintering temperature is high. When Pt is used, the weight of Pt relative to the weight of Ag is more desirably more than or equal to 5%.

Further, in the above exemplary embodiment, an alloy in which Au is added to Ag is used as internal electrode 13, but an alloy of silver palladium may be used instead of Ag, and Au or Pt may be added thereto. Also in this case, the same effect can be obtained by setting the total weight percentage of Pt and Au to the weight of the metal constituting internal electrode 13 to between 2 wt % and 30 wt % (inclusive).

In the above exemplary embodiment, an alloy obtained by adding Au to Ag is used as internal electrode 13, but internal electrode 13 may be formed by preparing a metal paste using metal particles in which a surface of Ag or a metal containing Ag as a main component is covered with Au or Pt, and sintering the metal paste. Since Ag diffuses from the surface of the metal particle to varistor layer 12, the effect of diffusion prevention can be further enhanced by covering the surface of each particle with Au or Pt. Since Au or Pt diffuses from the surface of Ag or a metal containing Ag as a main component during sintering, the concentrations of Pt and Au at the surface portion of the metal particle are higher than the concentrations of Pt and Au at the central portion of the metal particle after sintering. In this way, a laminated varistor excellent in clamping voltage ratio can be obtained.

Table 1 shows experimental results when internal electrode 13 is formed by adding Au or Pt to Ag.

First, a varistor material containing ZnO as a main component and additives such as $Bi_2O_3$, $Co_3O_4$, $MnO_2$, and $Sb_2O_3$ is mixed and pulverized. Thereafter, the mixed and pulverized varistor material is mixed with a polyvinyl butyral resin as an organic binder, n-butyl acetate as a solvent, benzyl butyl phthalate as a plasticizer, and the like to obtain a slurry. Then, the slurry is molded by a doctor blade method or the like to prepare a ceramic sheet to be a varistor layer.

On the other hand, a metal powder obtained by covering the surfaces of Ag particles with Au as a conductive metal powder is mixed with a polyvinyl butyral resin as an organic binder, n-butyl acetate as a solvent, benzyl butyl phthalate as a plasticizer, and the like. Thereafter, the mixture is kneaded using a roll mill or the like to prepare a metal paste for forming internal electrode 13.

TABLE 1

| Sample No. | Ag content in internal electrode (wt %) | Metal added into internal electrode (A) | Metal (A) content in internal electrode (wt %) | State of metal added to Ag powder | V1mA (V) | V1A (V) | Clamping voltage ratio (V1A/V1 mA) |
|---|---|---|---|---|---|---|---|
| 1 | 100 | — | — | — | 28.02 | 49.93 | 1.782 |
| 2 | 98 | Pt | 2 | Alloyed | 27.45 | 47.60 | 1.734 |
| 3 | 95 | Pt | 5 | Alloyed | 27.39 | 47.25 | 1.725 |
| 4 | 90 | Pt | 10 | Alloyed | 27.33 | 46.41 | 1.698 |
| 5 | 80 | Pt | 20 | Alloyed | 27.27 | 46.25 | 1.696 |
| 6 | 70 | Pt | 30 | Alloyed | 27.08 | 45.85 | 1.693 |
| 7 | 98 | Au | 2 | Alloyed | 27.28 | 46.40 | 1.701 |
| 8 | 95 | Au | 5 | Alloyed | 27.19 | 46.01 | 1.692 |
| 9 | 90 | Au | 10 | Alloyed | 27.15 | 45.48 | 1.675 |
| 10 | 80 | Au | 20 | Alloyed | 27.09 | 45.27 | 1.671 |
| 11 | 70 | Au | 30 | Alloyed | 26.87 | 44.85 | 1.669 |
| 12 | 98 | Au | 2 | Coated | 26.98 | 45.16 | 1.674 |
| 13 | 95 | Au | 5 | Coated | 26.85 | 44.84 | 1.670 |
| 14 | 90 | Au | 10 | Coated | 26.79 | 44.61 | 1.665 |
| 15 | 80 | Au | 20 | Coated | 26.78 | 44.51 | 1.662 |
| 16 | 70 | Au | 30 | Coated | 26.65 | 44.21 | 1.659 |

Sample No. 1 is a comparative example, and in each case, a laminated varistor having a smaller clamping voltage ratio than the comparative example is obtained.

Here, as the varistor voltage, a voltage value ($V_{1mA}$) when a DC constant-voltage power supply was connected to a pair of external electrodes and a current of 1 mA flowed was measured. As the clamping voltage, a voltage peak value ($V_{1A}$) between the pair of external electrode terminals when an impulse current having a standard waveform of 8/20 μs with a peak value of 1A was applied was measured. The clamping voltage ratio is obtained by dividing $V_{1A}$ obtained when an impulse current having a standard waveform of 8/20 μs with a peak value of 1A is applied by a voltage value obtained when a current of 1 mA flows, and is used to compare and evaluate clamping voltages at different varistor voltages. The clamping voltage ratio is desirably closer to 1.

From the above results, it can be seen that, among the metals contained in internal electrode 13, the higher the standard reduction potential, the greater the influence on the reduction in the clamping voltage (reduction in clamping voltage ratio). The higher the ratio of Pt and Au relative to Ag, the greater the effect. In addition, it can be seen that the diffusion of Ag into the ceramic is smaller and the effect is greater when the Ag powder is coated with the added metal than the alloy powder of Ag and the added metal. However, the amount of Pt or Au added is preferably less than or equal to 30 wt % because the price of Pt or Au is very high with respect to Ag in excessive addition.

Next, a method for manufacturing the laminated varistor according to the exemplary embodiment of the present disclosure will be described.

As a method of covering the surface of Ag particles with Au, plasma CVD can be used. Alternatively, an Au or Pt film may be formed on the surfaces of Ag particles by electroless plating. Further, a sol-gel method may be used.

Next, a predetermined number of ceramic sheets are laminated, and ceramic layers having a desired thickness are laminated and formed.

First internal electrode 13*a* having a predetermined shape is formed on the ceramic layer.

Next, a ceramic sheet is laminated on the ceramic sheet on which first internal electrode 13*a* is formed, and second internal electrode 13*b* having a predetermined shape is further formed on the ceramic sheet.

Here, first internal electrode 13*a* and second internal electrode 13*b* are formed so as to face each other with the ceramic sheet interposed therebetween to form a pair of internal electrodes 13. First internal electrode 13*a* and second internal electrode 13*b* are formed to be shifted so as to be alternately connected to left and right external electrodes 14, respectively.

Next, a ceramic sheet is laminated on second internal electrode 13*b*, pressed and press-bonded, and then cut into a predetermined shape to obtain a molded body to be a laminated varistor element.

As an example, the molded body is filled in a sheath, heated to 900° C. to 1100° C. at a temperature raising rate of 200° C./h (h: time, 1h=1 hour), held at a maximum temperature for 2 hours, then cooled at a temperature lowering rate of 100° C./h, and fired.

At this time, varistor layer 12 and internal electrode 13 are sintered, but since the surfaces of Ag particles are covered with Au, diffusion of Ag into the varistor layer can be prevented. Therefore, a laminated varistor excellent in clamping voltage ratio can be obtained.

After firing, the laminated varistor element is chamfered, and a pair of external electrodes 14 containing Ag as a main component is formed on the exposed end surfaces of the pair of internal electrodes 13 and baked. Then, laminated varistor 11 having a length (L) of 1.6 mm×a width (W) of 0.8 mm and a height (T) of 0.8 mm of the element outer shape including the pair of external electrodes 14 is obtained.

The laminated varistor according to the present disclosure can provide a laminated varistor excellent in clamping voltage ratio, and is industrially useful.

What is claimed is:

1. A laminated varistor comprising at least a pair of internal electrodes provided in a varistor layer containing ZnO as a main component, wherein each of the internal electrodes is made of a metal containing Ag and Au, and a weight percentage of Au to a weight of the metal constituting each of the internal electrodes is between 10 wt % and 30 wt % inclusive.

2. The laminated varistor according to claim 1, wherein each of the internal electrodes is composed of a sintered body of alloy powders containing Ag and Au.

3. The laminated varistor according to claim 1, wherein each of the internal electrodes is composed of a sintered body of metal powders, and a concentration of Au at a surface portion of the metal powders are higher than a concentration of Au at a central portion of the metal powders.

4. The laminated varistor according to claim 1, wherein none of the internal electrodes contains Pd.

5. The laminated varistor according to claim 2, wherein none of the internal electrodes contains Pd.

6. A laminated varistor comprising at least a pair of internal electrodes provided in a varistor layer containing ZnO as a main component, wherein:

each of the internal electrodes is composed of a sintered body of alloy powders containing Ag and Au, and the alloy powders does not contain Pd, and a weight percentage of-Au to a weight of the metal constituting each of the internal electrodes is between 2 wt % and 30 wt % inclusive.

7. A laminated varistor comprising at least a pair of internal electrodes provided in a varistor layer containing ZnO as a main component, wherein:

each of the internal electrodes is composed of a sintered body of metal particles containing Ag and at least one element selected from Pt and Au, a total weight percentage of the at least one element Au to a weight of the metal constituting each of the internal electrodes is between 2 wt % and 30 wt % inclusive, and a concentration of the at least one element at a surface portion of the metal particles is higher than a concentration of the at least one element at a central portion of the metal particles.

8. The laminated varistor according to claim 7, wherein each of the internal electrodes does not contain Pd.

9. The laminated varistor according to claim 1, wherein the varistor layer further contains at least one selected from the group consisting of $Bi_2O_3$, $Co_3O_4$, $MnO_2$ and $Sb_2O_3$.

* * * * *